US008256687B2

(12) United States Patent
Rivaillier (10) Patent No.: US 8,256,687 B2
(45) Date of Patent: Sep. 4, 2012

(54) METHOD OF CODING INFORMATION IN A DUAL FASHION ON PHYSICAL MEDIA AND IN DOTEM COMPUTERISED FORM

(75) Inventor: Jacques Rivaillier, Magny-les-Hameaux (FR)

(73) Assignee: Alphacode, Magny-les-Hameaux (FR)

( * ) Notice: Subject to any disclaimer, the term of this patent is extended or adjusted under 35 U.S.C. 154(b) by 244 days.

(21) Appl. No.: 12/842,101

(22) Filed: Jul. 23, 2010

(65) Prior Publication Data

US 2011/0012975 A1    Jan. 20, 2011

Related U.S. Application Data

(63) Continuation-in-part of application No. 11/890,294, filed on Aug. 3, 2007, now Pat. No. 7,878,413, which is a continuation of application No. PCT/FR2006/000275, filed on Feb. 7, 2006.

(30) Foreign Application Priority Data

Feb. 16, 2005    (FR) ...................................... 05 01552

(51) Int. Cl.
*G06K 19/06* (2006.01)
(52) U.S. Cl. ...................................................... 235/494
(58) Field of Classification Search .................. 235/454, 235/462.01, 494
See application file for complete search history.

(56) References Cited

U.S. PATENT DOCUMENTS

| 3,991,300 | A | 11/1976 | Chadima, Jr. |
| 4,545,066 | A | 10/1985 | Gascuel et al. |
| 4,998,010 | A | 3/1991 | Chandler et al. |
| 5,126,542 | A | 6/1992 | Priddy et al. |
| 6,273,340 | B1 | 8/2001 | Rivailler |
| 6,533,182 | B1 * | 3/2003 | Ohshima et al. .............. 235/494 |
| 6,830,198 | B2 | 12/2004 | Walmsley et al. |
| 7,097,099 | B2 | 8/2006 | Hepworth et al. |

(Continued)

FOREIGN PATENT DOCUMENTS

FR    2 804 532    8/2001

(Continued)

*Primary Examiner* — Seung Lee
(74) *Attorney, Agent, or Firm* — Harness, Dickey & Pierce, P.L.C.

(57) ABSTRACT

DOTEM is an information-coding method which is used to represent same on physical media with the aid of dots and in a computerised format, in memory and on networks with bits. The method is based on the broad concept of characters grouped into alphabets. The characters comprise dots on documents, for example, and bits in machine format. The physical characters have specific dots that are not represented in machine format in order to enable same to be located on media, such as the foot of a character and the head of a character. Each character can represent at least the 256 values of an octet. The character concept is extended such that it can be identified by the value thereof and, such that it can be identified by the value thereof and, taken together, can represent one or more variables having any dimension but determined in the structure of the character. The complex data and the context thereof can be described by a series of characters in the form of words or even sentences with a direct language correspondence. As a result, the representation is simpler and more concise. The characters are constructed over several columns for documents and over several octets for machine format. The characters can code values far greater than the octet, such that tags or field delimiters can be designated directly without the need for prior formatting.

8 Claims, 6 Drawing Sheets

U.S. PATENT DOCUMENTS 7,581,683 B2    9/2009    Walmsley et al.

FOREIGN PATENT DOCUMENTS

| | | |
|---|---|---|
| FR | 2 806 200 | 9/2001 |
| FR | 2 809 210 | 11/2001 |
| FR | 2 815 155 | 4/2002 |
| FR | 2 820 260 | 8/2002 |
| WO | WO 99/26194 | 5/1999 |
| WO | WO 99/26196 | 5/1999 |
| WO | WO 02/052486 | 7/2002 |
| WO | WO 03/023703 | 3/2003 |
| WO | WO 03/025847 | 3/2003 |
| WO | WO 03/043000 | 5/2003 |

\* cited by examiner

METHOD OF CODING INFORMATION IN A DUAL FASHION ON PHYSICAL MEDIA AND IN DOTEM COMPUTERISED FORM

CROSS-REFERENCE TO RELATED APPLICATIONS

This application is a continuation-in-part of U.S. Ser. No. 11/890,294, filed on Aug. 3, 2007, which is a continuation of Application No. PCT/FR2006/000275, filed on Feb. 7, 2006, which claims priority to French Application No. 05/01552, filed on Feb. 16, 2005. All of these applications are incorporated by reference herein.

BACKGROUND AND SUMMARY

I—Introduction

Many methods of representing information in digital form are known, in particular character codes such as bar codes and message codes such as 2D codes. Only the latter make it possible to code a byte (256 values) and to represent a computer file. The Dote character code is also known, each character of which can code 1024 values, that is to say the equivalent of 4 bytes.

The DOTEM method that we are presenting is an improvement to the DOTE® method, French patent No 00 06411 and the PCT patent No 0102889 of the same inventor, which he is supplementing and developing.

II—Presentation

In data processing, all the information is finally coded in the form of bytes, which each have a value of between 0 and 255. The DOTEM method makes a particular structure or character correspond to each of these values. All these characters are grouped together in the form of alphabets each comprising several character fonts. The originality of the invention lies in the construction of the structure of these representations and the properties that stem from this.

The DOTEM representation is of the 2D type (the information is coded in 2 dimensions, x and y), unlike the representation of 1-dimensional character codes such as bar codes. Each byte is represented, in the DOTEM method, by a specific structure that is independent of the size and content of the file, unlike the great majority of bi-dimensional codes (2D), which each represent all the information by specific global graphical structure where there are no characters. These are 'global' codes, unlike the present concept, which is 'alphabetic', and therefore open.

The aim of the DOTEM method is:
- to represent the computer files, partially or totally, conjointly on any physical medium, and in computerised form, in memory and on a network;
- to simplify the formatting conventions and codings by characters with a value greater than one byte and/or representing complex variables;
- to increase the security of processing (auto-checking at character level).

DETAILED DESCRIPTION

Definitions

DOTEM alphabet: set grouping together the character fonts with the same dimension, that is to say the same number of columns. Each alphabet comprises various physical character fonts. They have a particular geometric structure relating to the constitution of the header and possibly the foot of the character.

Dot: elementary information surface, generally binary, on any physical medium.

Mix Dot: dot consisting of a half dot, generally black, and a half dot without printing (white background). Generally the mixed dots of the header are black/white and those of the foot are white/black.

Bit: computer binary information element corresponding to the physical dot;

Columns: series of dots on a physical medium, for example paper;

Byte: series of 8 bits or computer character;

Definition of characters: this specifies the number of columns or bytes making up the character. The DOTEM characters are composed of at least two columns or bytes. The number of columns or bytes is not limitative. The characters are grouped together in alphabets, generally according to their number of columns (or bytes).

Physical characters: structure composed of columns of dots of 2 types:
- the detection/marking dots essential to the location of the characters on the physical medium. Their variants give rise to different fonts. They do not have an equivalent in data processing;
- the value dots that serve to code the 'weight' of the character (0 to 1023 for the 2-column alphabet). They code the general information. Each value dot corresponds to 1 data processing bit.

Data processing characters: structure usually of 8 bits or one byte, always binary;

Column head: black dot or mixed dot, the latter is composed of a black half dot and a white half dot;

Column foot: last dot, generally mixed, of the column. It usually determines the first column of a physical character;

Character header: set of black dots, generally alternating with mixed dots, capping the body of the physical characters;

Character foot: at the bottom part of the physical characters outside the dots coding the information and which alone correspond to bits of the data processing characters. The existence of a character foot is optional and depends on the font.

Column body: part of the column outside the character header and possibly foot, the dots of which correspond directly to the bits of the byte with the same structure;

Richness or power of representation of a character: this is the possibility of the character being able to represent a number of different values. A byte can take 256 different values. A DOTEM character with 2 columns can represent 1024 of them, with 3 columns 16384, etc.

Delimiter or tag or index: these are the characters whose value exceeds 255 (max. value of the byte), used in particular to delimit and describe the fields.

The DOTEM method is based on the original association and implementation of the following concepts:

1—Concept of Alphabet

Definition of the alphabet in general: system of signs (letters) serving to transcribe a language. Here language may correspond to a field of application. Unlike bar codes or 2D codes, this concept of alphabet confers on the DOTEM method a very great flexibility to the specificities of the various applications. The characters or structures grouped together in alphabets can quantify one or more specific variables peculiar to the field, thus defining any complex variables (by analogy with complex numbers). A series of such characters makes it possible to describe sets of multiple data and their context, like the words and sentences of a language.

Moreover, management of security by means of redundancy is free and accepts any concept in order to adapt more effectively to the constraints of the sometimes contradictory applications. The user keeps complete freedom in its implementation. The representation can be linear or not, without limitation on size. On a document, the writing can be carried out on an edge horizontally or vertically, as well as over the entire length of a continuous object (paper or piece of cloth, etc).

2—Generalisation of the Concept of Character

Each DOTEM character has its dual or 'double' in data processing. A character on a physical medium referred to as a 'physical character' has its dual in memory or on a network referred to as a 'computer character'.

EXAMPLE 1 character formed from dots on paper corresponds to 1 byte formed from bits in machine format. For the value dots which alone support the useful information:
I black dot=1 '1' bit and 1 white dot=1 '0' bit.
This one-to-one mapping simplifies the interface software. In addition the size of the characters and their spacing on a physical medium is totally free. Writing can be carried out line by line to any dimension with also any line spacing.

3—Concept of Specific Structure of the Characters

The DOTEM characters have a specific structure that confers on them the following properties:

Possibility of detection whatever their position in a data stream or on a physical medium.
The structure of the columns or byte is interlaced (see the chapter on structure of principal alphabets). This particular structure, linking several columns or bytes, makes it possible to distinguish a DOTEM character in the middle of other information. The greater the definition, the higher the discrimination capability.
Possibility of detecting reading errors and to correct some of these at character level. The purpose of the check columns or bytes is to verify the coherence of the structure of the character. See the chapter on structure of principal alphabets.
Possibility of recognising the orientation of each character in the plane for the physical media. This property is provided by the character header and possibly foot; see the paragraph on structure of principal alphabets.
Complete transparency vis-à-vis computer processing operations such as compression, enciphering or overlaying and self-correction methods such as CRC, Reed Salomon, etc, which are added to those at the level of each character, etc.
Improvement of the efficacy of enciphering since the 256 values of a byte can be converted into 1024 (or more) independent values.

NB:

The DOTEM method uses several alphabets according to the definition of the characters. The number of dots per column is variable on principle. It is preferable to limit the number of value dots to 8 in order to simplify the correspondence with the bytes. However, in order to adapt to the constraints of certain applications (for example deformable media), the physical characters may be composed of columns of greater sizes, in particular character head and foot, with or without mixed dot.

4—Concept of Richness or Representation Power of the Characters

The structure of each character makes it possible to automatically detect its definition of 2, 3, 4, ... columns or bytes. Each column or byte contains a dot or a bit that indicates whether or not the following column or byte belongs to the character (property of linking). The number of values and their size potentially represented by a character depends on its definition (2 columns or more).

EXAMPLE

One 2 column or 2 byte character can represent 1024 values (10 bits in col. 2+1).
one 3 column DOTEM character has 2 different codings:
1. coding of 2 independent values of maximum:
   1024 in 10 bits (col. 2+1) and 16 in 4 bits (col. 3);
2. coding of one value in: 2 (col. 1)+8 (col. 2)+4(col. 3) linked=14 bits that is to say→16384 (values per character).
One 4 column DOTEM character has 3 different codings:
1. 3 independent values: 1024 (col. 1+2)+16 (col. 3)+ 16 (col. 4)
or
2. 2 independent values: 1024 (col. 1+2)+256 (col. 3+4)
3. 1 value for the 4 linked columns: 2 (col. 1)+8 (col. 2)+4 (col. 3)+4 (col. 4)=18 bits that is to say→262144 (values per character).

III—Structures of the Main Character Sets or Alphabets

1—General

If the computer characters are accessible directly through their address, the physical characters must be found in a plane. The latter must have, in addition to the computer characters, a structure making it possible to detect them and to find their orientation in the plane. To do this, they all have a header and sometimes a foot in addition to their body proper. The latter is identical for the 2 types of character, where each physical dot has its match in a computer bit. The physical dots can be of any solid shapes but all similar (circles, squares, rectangles, ellipses, etc) and the columns can be contiguous or not.

1—1— Structures of the Headers of the Physical Characters.

Figure 1:
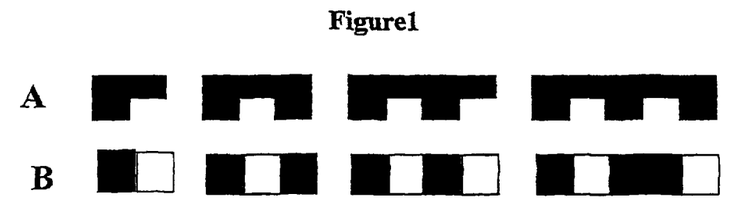
FIGS. 1-10 are diagrammatic views of the DOTEM method of the present invention.

These depend on the definition of the character, that is to say on the number of columns that make it up. It gains from being periodic (e.g. FIG. 1A, plate 1) and consisting of a succession of whole dots (generally black) and mixed dots or an absence of a dot (white background='white dot'), FIG. 1B. It commences with 1 dot (black) followed by a mixed dot or a 'white dot' and then 1 dot (black) and so on in order to make up a crenellated line serving to detect the row of characters and to effect the separation of the columns. It also serves to correct the horizontality or the orientation of the row as well as the orientation of the characters.

Figure 2:
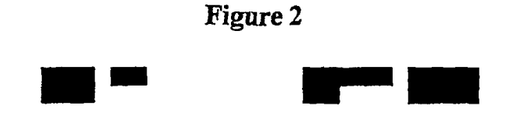

The crenellation can have any horizontal pitch and the dots separated by inter-columns also of any value (FIG. 2). In certain cases (FIG. 6) it is advantageous to replace the black dots of the header with sufficiently dark grey dots in order to be easily detected during a multilevel analysis in order to increase the coding possibilities.

NB:

The mixed dots do not necessarily require a definition twice that required for analysing whole dots. This is because it is not necessary to measure the half dot but only to detect the presence of a smaller dot. This amounts to introducing additional information while being content with a lesser definition. However, some applicative conditions do not permit this use. This is the case in particular with media that may be creased. The mixed dots are then replaced with normal dots or the absence of a dot and the columns are generally extended by one or more dots.

1—2— Structures of Heads and Feet of Columns of Physical Characters.

The column head is the part of the character header that caps the column. The head of the first column (odd No) is a dot (black), that of the second column (even No) is preferably a mixed dot (white/black) and so on for the characters with more than 2 columns. However, the half dots can be replaced by an absence of a dot 'white dot' or a dot (black) according to the design of the font. The last case is used in particular to produce a (black) line all along the row of characters, then detectable as one and the same connected component. The foot of the first column (or last dot) is preferably formed by a mixed dot but may comprise 1 or more (black) dots for the fonts meeting particular conditions of use. The foot makes it possible to characterise the first column (the start of the character) and to determine the base of the physical character.

NB: the bit $2^7$ is equal to 1 in the $1^{st}$ byte of the computer character.

1—3— Structures of the Bodies of the Columns of the Physical Characters or Bytes.

The structure of the bodies of the columns (or bytes) is particular for each of the columns as far as the 3-column definition and then gains from being periodic. This character has a so-called value column (byte) that codes the 256 values of the byte and at least one so-called control/extension column (or byte) that makes it possible to interlace the columns (or bytes), to detect reading errors, to correct certain errors and to extend the coding of the values. In the body of the columns (physical character) each dot corresponds to 1 bit (computer character) and vice versa.

2Two-Column (or Two-Byte) Definition Characters. PLATE I.

The columns and bytes being identical dot to bit, only the columns will be described.

2—1—Structure of the First Column.

Figure 3:
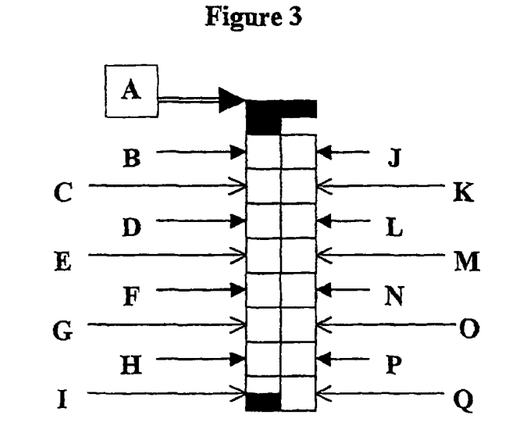

The dots are marked in FIG. 3, plate 1. The column head is designated by the part of A above the column (1 black dot). All of dots B to I and below constitute the body of the column. It consists of 8 dots, preferably contiguous and of the same size. The first dot B of the body serves to detect any error on this column. It represents the odd part of the number of black dots. The total number, excluding foot and head, is therefore always even.

Dots 2, 3, 4 (C, D, E FIG. 3) serve to control the structure of the column 2. Dot C is black (bit 2=1) if the number of black dots in col. 2 is even. Dot D is black (bit 3=1) if the number of black segments in col. 2 is even. Dot E is black (bit 4=1) if the dot J in col. 2 is black (corresponding bit=1). Dots 6 and 7 (G, H) allow an extension to $2^{10}$ of the codification of the values of the character. Dots G=$2^8$ and H=$2^9$ if they are black. Dot 5 (F) gives information on the extension or not of the 3-column definition.

If F is black the character has only 2 columns, if it is white the third column forms part of the same character. When the dots are weighted, the lowest weight commences from the header.

2—2Structure of the Second Column.

The column head is illustrated by part A FIG. 3 plate 1 above the column. It is preferably one of the types in FIG. 1 plate 1. The following dots constitute the body of the column. They are weighted from $2^0$ (J) to $2^7$ (Q). They serve to code the 256 values of the byte.

3—Three-Column (or Three-Byte) Definition Characters.

Figure 4:
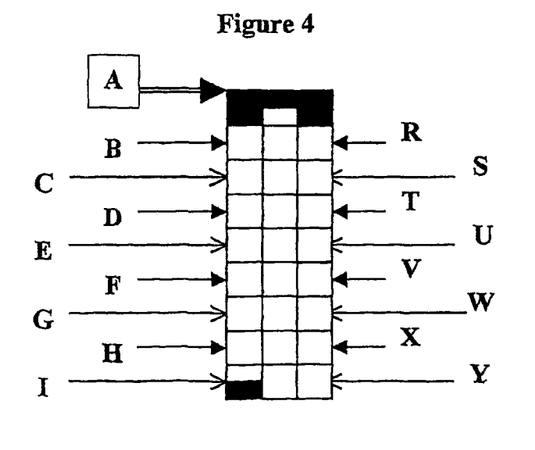

The first two columns have the same structure as that of the 2-column character. The third is shown in FIG. 4. It is as follows: The first dot R serves to detect any error on this column. It represents the odd parity of the number of black dots. The latter is therefore always even. The dot S indicates whether or not the following column belongs to the same character. The dot T is black (bit 3=1) if the number of black segments in column 1 is even.

The dot U is black (bit 4=1) if the dots V, W, X, Y represent the extension of the coding of column 1 (corresponding bit=1). It is white to indicate that the coded value is independent (0 to 15 by means of the 4 dots V, W, X, Y). The dots 5, 6, 7 and 8 (V, W, X, Y) allow an extension of the codification of the values of the character or an independent value. These dots are weighted, the lowest weight commences as from the header, here the dot V.

4—Characters with a Definition Greater than 3 Columns (or >3 Bytes): PLATE 2.

Figure 5:
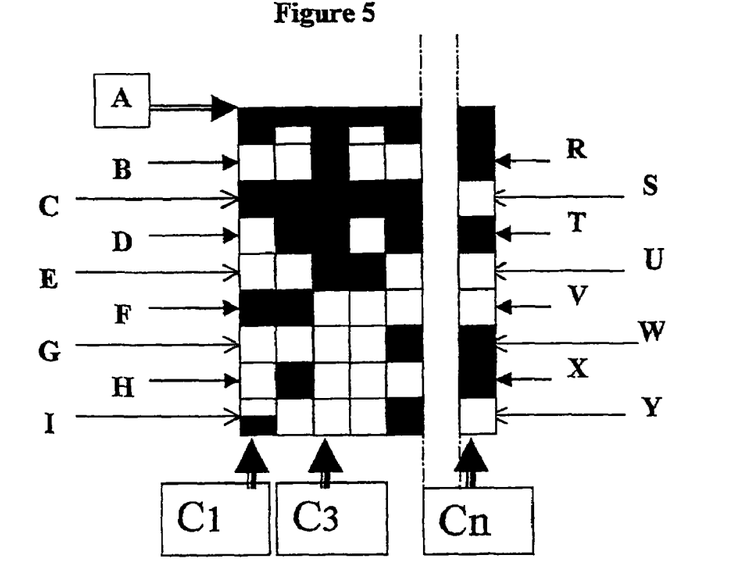

It is recommended to repeat the structure of the 3-column character described previously and to supplement it with columns of the same type as column No 3 in sufficient numbers to represent the information in accordance with the required form. They may be independent or linked in any way. FIG. 5 shows an example of a character with more than 6 columns. The first 4 are linked in order to increase the coded value, the fifth is independent, etc. However, the columns beyond the third may be different, but the extension dot of the definition must remain dot 2 of the body and comply with the convention black (or 1) for the end of the character and white (or 0) to link it to the following column.

IV—Development of the Possibilities of Representing Information by Means of the DOTEM Characters 1—General.

The DOTEM characters allow the encapsulation of information in non-limitative numbers and values. A character consists at a minimum of 2 columns or 2 bytes but this number is not limited. It can then represent information in one or more formats that are complex to a greater or lesser extent. This is because columns 3 and more can be independent and each represent 16 values. They can be linked in any number in order to represent high values or independent in order to represent complex data with several fields.

The DOTEM method allows the representation of complex information in several ways, which may be mixed.

The first consists of using simple characters, for example with 2 columns with values >255 in order to represent 'tags' or 'delimiters' that determine specific data fields, followed by as many characters (or data items) as necessary in the fields.

The second consists of composing an alphabet peculiar to the application field whose characters represent multiple but generic variables that will be associated, such as the letters of a word in order to represent complex information.

If the characters are well produced, the writing will be more obvious, rapid and concise.

2—Links with Other Structures.

In conventional alphabets the concept of kerning links 2 characters and in a similar fashion several DOTEM characters can be linked. This is because, if the start of the following character occurs while the coding of the previous one provides for the continuation of the same character (dot 5), this means that the 2 characters have a common property or that the pair thus formed expresses a particular item of information. The number of consecutive characters thus linked is not limitative.

EXAMPLE

This method makes it possible to code an isolated field with a length that is variable and in principle unknown. The field is qualified by a tag (or delimiter) and all the constituent characters are thus linked together as far as the last, automatically determining the length of the field.

3Non-Binary Dots.

The production of structures (or characters) on a physical medium such as a document generally takes place in black and white. The use of colour allows aesthetic effects that can be developed with DOTEM structures, but also the colours also increase the coding capacity of the information. The various colours can be replaced by n shades of grey. Reading does however risk proving to be more tricky. Thus a physical structure dot represents several bits of a computing structure: a physical character of p columns (on paper for example) can represent more than p bytes in memory.

EXAMPLE

Figure 6:
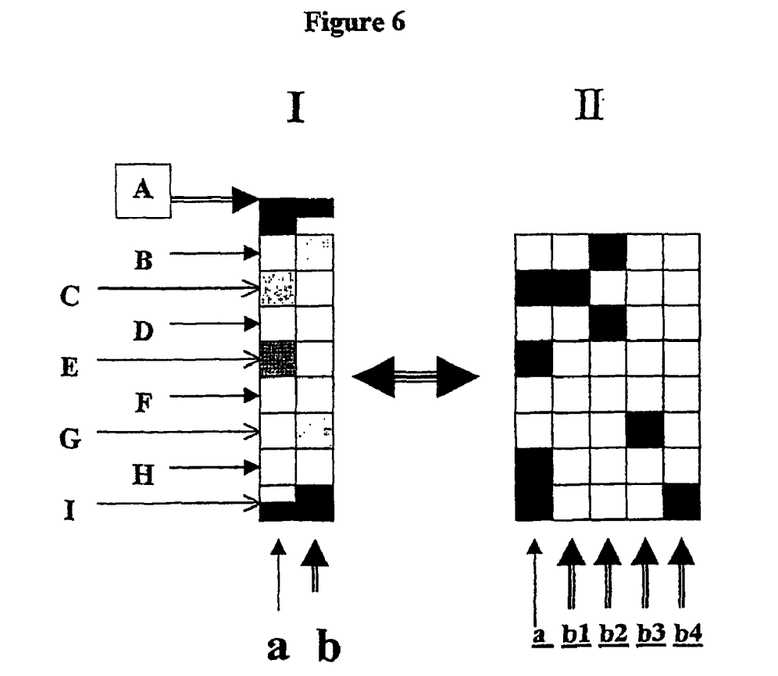

For n=4 (black, red, green, blue) a doubling of the bytes corresponding to one column is obtained (FIG. 6 Plate 2).
Idot→2 bits→Black→00, Red→01, Green→10, Blue→11
The data processing characters are always binary.

4Representations of Functionalities.

Functionalities can be processed by the association and weighting of variables appropriate to the application within the character.

5Particular Cases, Example of Anti-Deletion Characters.

To combat fraud that consists of deleting the identification and authentication information, a specific type of character is produced so that the first column ($1^{st}$ byte) is coded differently from the previous characters. In particular dots or bits 2, 3 and 4 are coded the opposite way round. It will not be recognised as a DOTEM character and will trigger an error, but will indicate that it is a case of character of the anti-deletion type. Columns 3 et seq represent the number of protective characters of the text or file allowing the detection of the number of deleted characters.

Another way of dealing with this problem consists of calling a tag for this function for example 1023, the following character or characters indicating the number of linked protected characters; this makes it possible to check the number of characters possibly deleted in the protected zone.

V Presentation of Applications

1—General.

It is an advantage for certain fields to define a specific alphabet. The DOTEM method makes it possible to construct very rich characters containing much Information, for example: The first 2 columns code 1024 values each corresponding to a character number (1024 characters), the following columns can code values of variables particular to the field. The number of variables and their limit value are not limitative. The characters then have the appropriate number of columns. The succession of characters thus formed, to which a name can be given for more convenience, make it possible to represent a large number of complex 'objects' in condensed form and with great flexibility. This concept makes it possible where necessary to construct a particular semantics and rules for use like a language.

2—Application to the Audible Field.

In this field it is advantageous to define at least one set of characters coding several associated variables but of independent value in order to adapt to requirements. It is necessary to proceed with the definition of the structures or characters best meeting the problem. They will for example have to represent: a binary computing and physical identification value, a frequency and a duration of audible execution, possibly a sound level. Other expressed variables may be added, on documents or in computing format, or during audible retrieval etc. The character is more and more composed of columns as it represents more and more information that it encapsulates. It is important to judge whether it is preferable to increase the number of characters within an alphabet or possibly to create another alphabet rather than excessively burdening the definition of the characters. Each case presents an optimum.

Remark 1: In this example, there are several ways of coding the information. The first uses frequencies and durations defined in ranges pre-established to reduce the number of columns of characters. The other directly specifies the data in their unity such as the frequency in Hz and the duration in ms. The characters are more bulky but ranges or tables are unnecessary.

Way 1 consists of:
an identifier to each character (from 0 to 1023) to which a name can be given; this identifier is coded on cols 1 and 2 (10 bits);
a variable representing a corresponding frequency from a range of 16 values coded in col. 3 (independent);
a variable representing a corresponding duration from a range of 16 values coded in col. 4 (independent).
The definition of the character is 4 columns and will be a member of alphabet 1.

Way 2 consists of:
an identifier to each character (1024 possibilities) as before;
a variable representing a frequency expressed in Hz, coded in cols 3, 4 and 5 (linked cols) from 0 to 16384 Hz.
a variable representing a period expressed in milliseconds coded in cols 6 and 7 (linked cols) from 0 to 256 ms.
The definition of the character is 7 columns and will be a member of alphabet 2.

Remark 2: Appreciably audible parts can be coded by DOTEM characters that include within them identification and authentication data so that their deletion, if it allows the loss of identification and authentication, significantly degrades the sound recording or retrieval. The representation of musical scores could also use a particular construction, in particular in machine format.

3—Application to the Chemical Field.

In the same way chemical compounds can be represented in a condensed and practical fashion by means of specific characters, such as for example: The first 2 columns for the designation value (1024), the following 2 or 3 for the 256 simple bodies of base products, the following for the concentration, the following the proportion in the mixture, etc. The formulae developed could also be described in a very condensed fashion.

Remark: It may be useful to define several specific alphabets per field.

4—Security Application: Identification, Authentication (Alphabets for Logos, Seals and Signatures).

The possibility of coding 1024 values by 2-column characters makes it possible to have available in addition 256 values of the byte of 768 which serve principally to designate tags. Some can be used for particular functionalities. This is the case with 'drawing' characters which represent in particular logos (or seals) and signatures within any alphabet. Alphabets of handwriting can thus be created.

Properties:

The first 2 columns correspond to the 2-column characters, but the following ones can be of any type without any construction rules. The last column has advantage in comprising at least one mixed dot in order to detect the end of drawing character. The purpose of these characters is to represent directly a particular drawing formed from dots or bits. These drawings can thus be represented with exactitude on a physical medium or in computing and can be chosen according to the context.

On a physical medium, they can be identified by eye and by optical reading (OCR) as in machine format by software with the representation in bits. These properties are used to guarantee the identification and authentication of texts or files.

Figure 7:
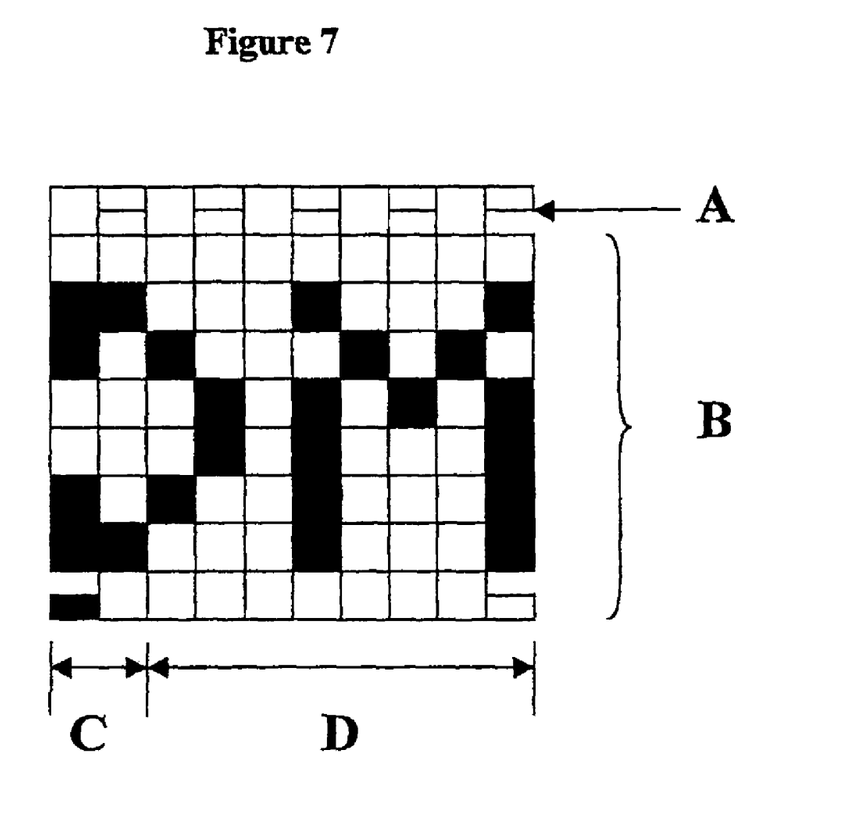

The example in FIG. 7 plate 3 illustrates DOTEM logo 'DM':
Value=833; A=header, B=body, C=2 standard cols, D=free cols.

Remark: Comparison of DOTE and DOTEM Methods.

These are both 2D codes based on the concept of the alphabet. They are composed of columns of binary elements. The Dote method comprises 2 columns, one of which describes parameters making up the second (the value column) and allows the extension of the coded value and optionally a third that represents the complement of the second (direct redundancy).

DOTEM comprises any number of columns also of any size, able to be automatically determined, and an optimised allocation without redundancy of the parameters of the value column. In addition, all the columns in any number are linked successively to one another and carry the information on the number of columns and any link with other characters. The DOTEM characters can code several variables of various dimensions, drawings, signatures, etc, whilst remaining compatible with a direct representation in a computer. Finally, DOTEM introduces a concept of mixed dot. DOTEM corresponds to a multi-criteria optimisation and extension of DOTE, and hence its name.

One embodiment of the invention is a method of processing information comprising at least:
 a coding operation consisting in digitally coding such information; and
 a printing operation consisting in printing the resulting coded digital information on a physical medium in the form of characters designed for subsequent machine-reading, each character consisting of a bi-dimensional arrangement of dots, each dot having at least one colour among a plurality of at least two colours, and each character extending on at least two columns and comprising at least a header, data, and up/down orientation marks.

Figure 8:
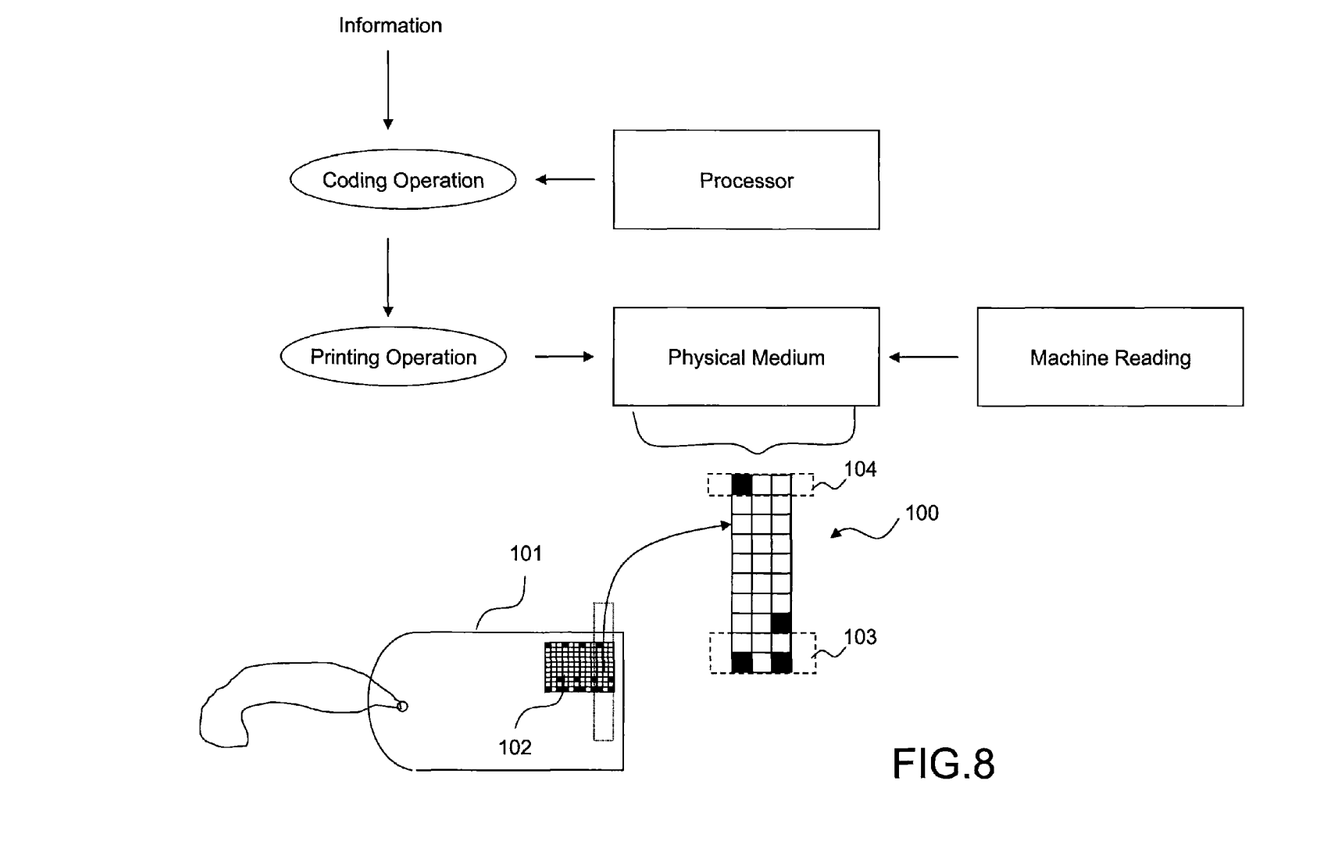

In this embodiment of the invention, the coding operation further comprises, for each character, the operation of choosing a number of columns as a function of digital information to be coded, and that the printing operation further comprises, for each character, the operation of printing, in a predetermined position of each column from the second column, at least one dot indicating whether such column is, or not, the last column of such character, whereby the width of each character is automatically adjusted, both during printing and machine-reading, as a function of the coded digital information without loss of space. In this embodiment of the invention, the method of processing information can also comprise a preliminary operation consisting in defining a plurality of character fonts and in assigning a dedicated digital code to each font of said plurality of character fonts, in that said coding operation further comprises, for each character, the operation of choosing a specific font among said plurality of fonts, and in that the printing operation further comprises, for each character, the operation of printing, in a predetermined position of the character, at least one dot coding said specific font, whereby the representation power of each character is extended. FIG. 8 illustrates two main operations of the previous embodiment of the invention method.

The coding operation can be completed by a processor. The printing operation can be realized on a physical medium as paper, disk, clothes or any support able to be printed. As an example, FIG. 8 represents a printing operation of a character 100 on a label 101. The character 100 comprises:
 a header 104 comprising one three-dotted line;
 a footer 103, also called detection/marking dots, comprising two three-dotted lines;
 a body comprising eight lines of dots corresponding to the data to encode by the method of the invention.

The character 100 is a part of a symbol 102. The symbol 102 comprises a plurality of characters juxtaposed and printed on the same label. The character 100 generated by the method of the invention can be read by a machine-reading equipment as an optical reader.

In this example, the data to be coded are printed on a label 101. The machine-reading is able to detect the orientation of the characters 100 or the symbol 102. If the data comprise a font, the coding operation permits to encode the character font. The invention comprises the operation of choosing a specific font among said plurality of fonts. A least one dot codes a specific font in a predetermined position of the character.

Figure 9:
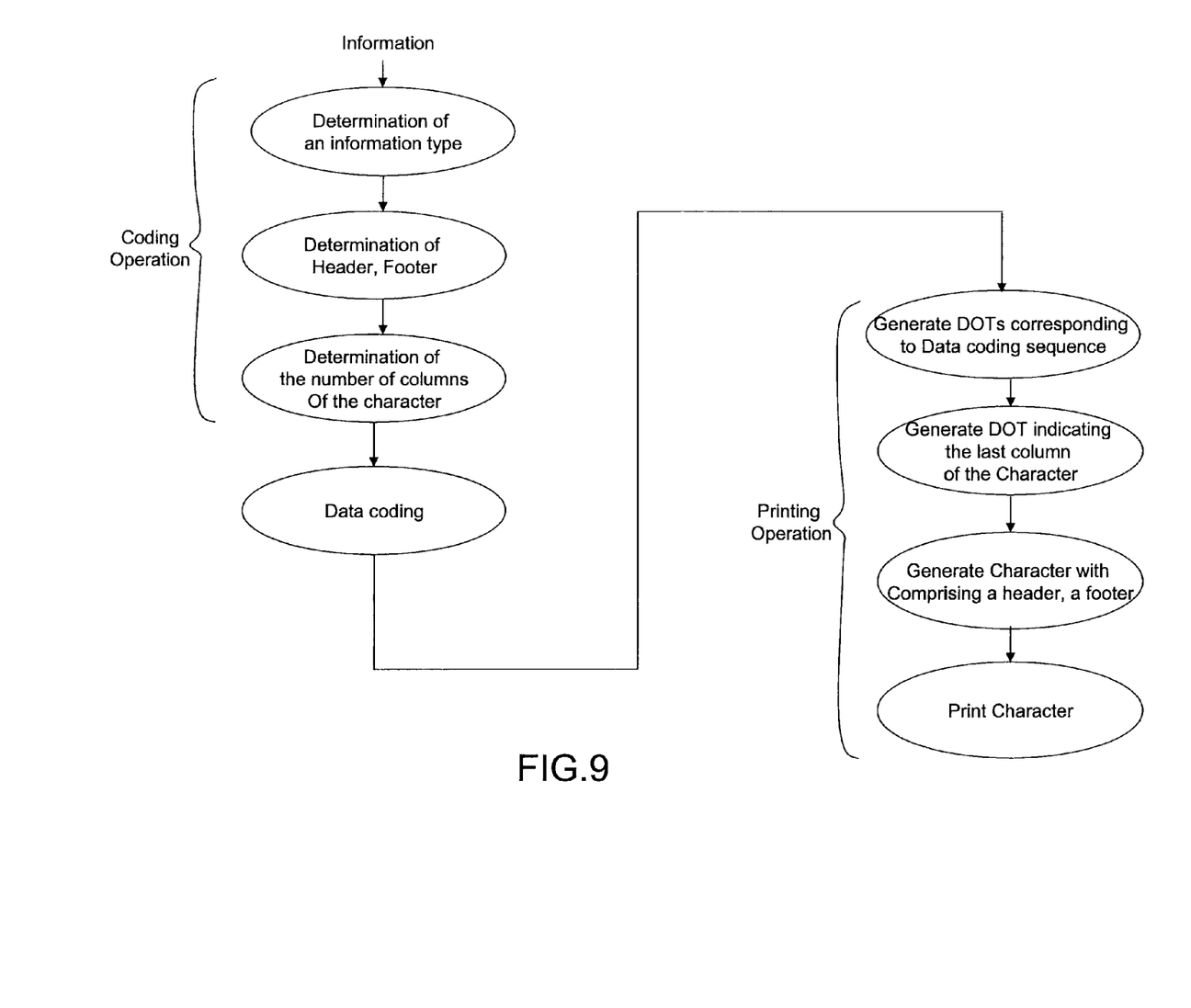

FIG. 9 is a flow diagram illustrating a method of processing information comprising a coding operation and a printing operation. The coding operation comprises a first step in order to define if the data comprise any type or font character to be encoded. The coding operation also comprises a second step in order to determine a header and a footer of the character. In particular, the header and/or the footer can contain some specific dots or a specific arrangement of dots permitting to decode:
 a specific encoding key for specific information to be encoded as confidential; or
 redundancy information necessary to ensure a good decryption; or
 any sequence of dots to distinguish a character from another in the printed symbol 102.

The coding operation comprises a third step in order to encode the number of columns of the character to be generated. The number of columns permits to encode several types of data which comprises a specific font. The coding operation comprises a fourth step in order to define the encoded dots sequence. The second, third and fourth steps can be completed in any order depending of the implementation of the method of the invention.

In one embodiment of the invention the number of columns of the character depend on the determination of a type which is determine at the first step. The information type to encode is a parameter which can be managed by a user. The way to choose the information type can be close to the choice of a font of a character chosen with a computer interface comprising an editor software.

As an example, the symbol 102 can code a specific invoice. The symbol 102 comprises different characters 100 which can represent in this example:
 the name of a customer
  type=name of customer, font=Arial
 the address of a customer, character 2
  type=address, font=Arial
 the terms of the allowance, character 3
  type=terms, font=Arial
 the price of the allowance, character 4
  type=price, font=Dollars
the advantage of the solution of the invention is to generate a small symbol 102 which contain all information of the invoice.

The use of an optical reader is appropriate to read some information of the invoice.

Another advantage of the invention is that the coding operation can adapt the number of columns of the character to be generated to the character type. In the last example, the terms of the allowance can contain data comprising several words. This type can be associated with a specific number of columns.

The printing operation comprises a first step permitting the generation of the graphical dot corresponding to an encoded data sequence. A preferred embodiment of the invention is to define a dot as a binary information. The dot is black when the value of a bit is one and the dot is white when the value of a bit is zero or inversely. The printing operation also comprises a second step in order to print a predetermined dot indicating if the column is the last one to print or not. This dot is called "last column dot".

A preferred embodiment of the invention permits to generate a last column dot having a black colour in the last line of body of the character. In this preferred embodiment, all dots of the last line of the body of a character, excluded the last column dot, are white. In that way a machine-reading can easily detect a black dot in the last line of each body character and determine the size of the character. This solution takes advantage in that this dot can also be used as a separator or a marker to decrypt the character sequence in the symbol 102.

The printing operation comprises a third step permitting the generation of the full character comprising the generation of a header and a footer. The printing operation comprises a last step which permits to print the character on a physical medium. The three first steps of the printing operation can be realised several times before completing the last step in order to generate a plurality of characters in a symbol 102.

Figure 10:
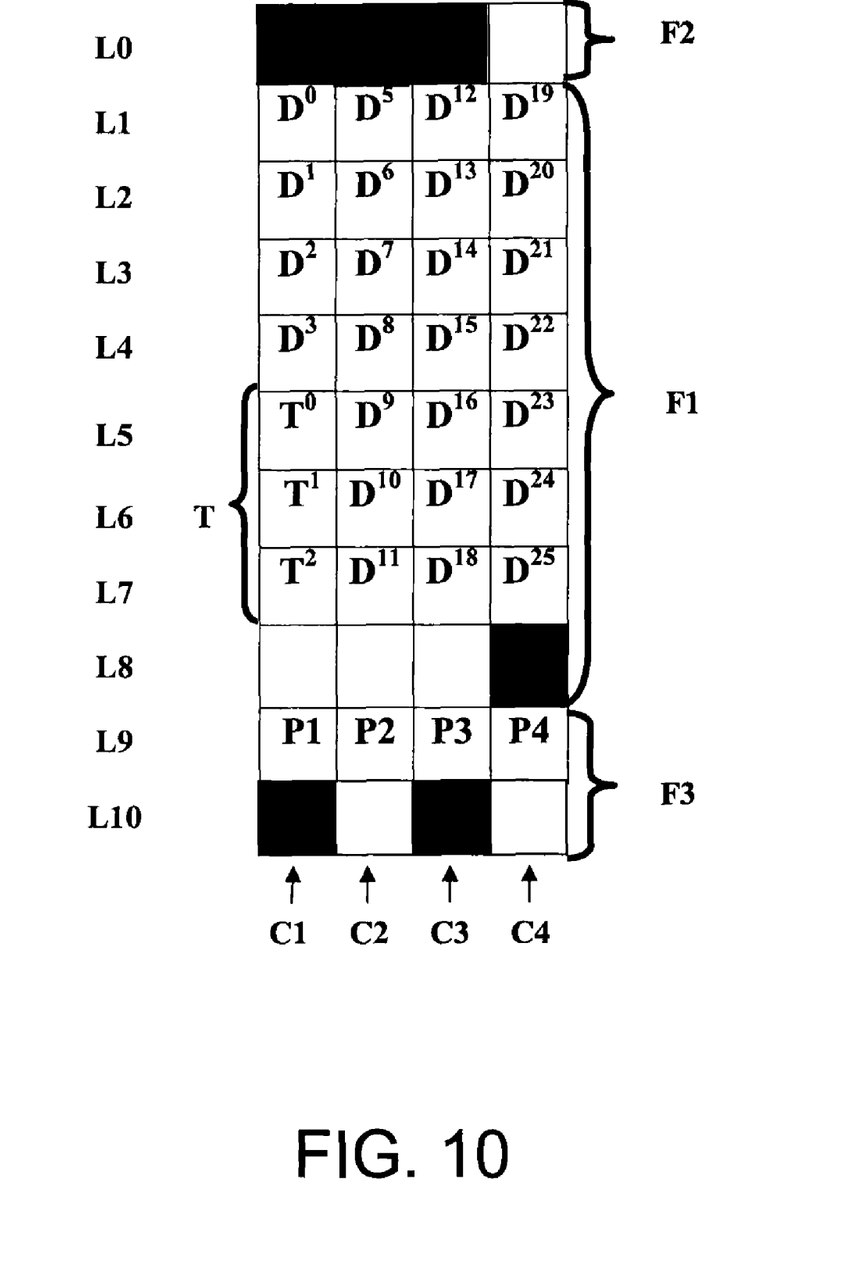

FIG. 10 illustrates a character printed by the method of the invention. In this embodiment of the invention, the character printed comprises four columns. Depending of the physical medium used, the printed character also comprises a header F2 which is represented by a first line and a footer which is represented by the last two lines F3. The character comprises a body F1 which comprises four columns. The header F2 and the footer F3 are used specially for printing on physical medium. If the representation of the character is not printed on a physical medium, but just read by a software application on a computer, the header F2 and the footer F3 are not necessary to decrypt the character.

In this embodiment, the last three dots $T^0$, $T^1$, $T^2$, of the first column of the first part F1 permits to define eight different character fonts or character types. Three bits $T^0$, $T^1$, $T^2$ offer $2^3$ possibilities to code the different character fonts or character types. For example, the invention permits to define a character font compatible with UNICODE and seven classes of tag fonts. In this example, for each column one dot, P1, P2, P3, P4, characterises the parity of the column. This dot is called "parity dot". The encoded data are noted $D^0$ to $D^{25}$ and permit to encode the data sequence in the coding operation.

What is claimed is:

1. A method of processing information, comprising at least a coding operation including digitally coding such information, and a printing operation including printing the resulting coded digital information on a physical medium in the form of characters designed for subsequent machine-reading, each character including a bi-dimensional arrangement of dots, each dot having at least one color among a plurality of at least two colours, and each character extending on at least two columns and comprising at least a header, data, and up/down orientation marks, wherein the coding operation further comprises, for each character, the operation of choosing a number of columns as a function of digital information to be coded, and that the printing operation further comprises, for each character, the operation of printing, in a predetermined position of each column from the second column, at least one dot indicating whether such column is, or not, the last column of such character, wherein the width of each character is automatically adjusted, both during printing and machine-reading, as a function of the coded digital information without loss of space.

2. The method of processing information according to claim 1, further comprising a preliminary operation including defining a plurality of character fonts and in assigning a dedicated digital code to each font of the plurality of character fonts, in that the coding operation further comprises, for each character, the operation of choosing a specific font among said plurality of fonts, and in that the printing operation further comprises, for each character, the operation of printing, in a predetermined position of the character, at least one dot coding the specific font, wherein the representation power of each character is extended.

3. The method of processing information according to claim 2, wherein the header comprises an alternating succession of black dots and mixed dots, mixed dots comprising a half black dot and a half white dot, or an absence of black dots in order to form a crenellated line.

4. The method of processing information according to claim 3, wherein the printed character comprises two columns and a group of predetermined dots as:
   2 dots reserved for the extension of the coding of the value coded by the value column;
   1 dot characterising the parity of the number of its own black dots;
   1 dot for the parity of the number of black dots in the value column;
   1 dot specifies the parity of the number of segments formed from black dots in the value column;
   1 dot gives the state of the first dot in the value column; and
   1 dot indicating whether the present column is the last of the character or whether the following control/extension column also forms part of it.

5. The method of processing information according to claim 3, wherein the first column of the structure of physical characters has a mixed last dot formed from a white half dot and a black half dot.

6. The method of processing information according to claim 3, wherein the third column of the characters of 3-column definition comprises:
   1 dot characterising the parity of the number of its black dots;
   1 dot indicating whether the present column is the last of the character or whether the following control/extension column also forms part of this character;
   1 dot expressing the linking of the properties or independence with the following control/extension column;
   1 dot specifies the parity of the number of segments of black dots of the previous control/extension column;
   4 dots reserved for the extension of the coding of the value coded by the previous columns; and
   the first two columns are identical to those of the characters defined on 2 columns.

7. The method of processing information according to claim 3, wherein the characters with a definition greater than three columns can be composed beyond the third by a succession of columns produced according to the same coding rules as column 3.

8. The method of processing information according to claim 2, wherein three predetermined dots define a specific font, wherein the representation power of each character is extended.

* * * * *